(12) United States Patent
Zhu et al.

(10) Patent No.: US 11,682,932 B2
(45) Date of Patent: Jun. 20, 2023

(54) ADDITIVELY MANUFACTURED MAGNETIC MATERIALS WITH STRUCTURAL DESIGNS

(71) Applicant: FORD GLOBAL TECHNOLOGIES, LLC, Dearborn, MI (US)

(72) Inventors: Leyi Zhu, Novi, MI (US); Chun Tang, Canton, MI (US); Franco Leonardi, Dearborn Heights, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 17/125,117

(22) Filed: Dec. 17, 2020

(65) Prior Publication Data
US 2022/0200365 A1    Jun. 23, 2022

(51) Int. Cl.
H02K 1/14 (2006.01)
H02K 1/274 (2022.01)
H01F 1/12 (2006.01)
H01F 7/02 (2006.01)
B33Y 80/00 (2015.01)

(52) U.S. Cl.
CPC ............. *H02K 1/146* (2013.01); *H01F 1/12* (2013.01); *H01F 7/02* (2013.01); *H02K 1/274* (2013.01); *B33Y 80/00* (2014.12); *H02K 2201/03* (2013.01)

(58) Field of Classification Search
CPC .......... H02K 1/146; H02K 9/25; H02K 1/274; H02K 21/02
USPC ....................... 310/156.01, 156.38
See application file for complete search history.

(56) References Cited

U.S. PATENT DOCUMENTS

| | | | |
|---|---|---|---|
| 10,269,479 B2 | 4/2019 | Simon et al. | |
| 2010/0256791 A1 | 10/2010 | Spicer et al. | |
| 2015/0171677 A1* | 6/2015 | Moon ................ | H02K 1/2706 310/156.38 |

FOREIGN PATENT DOCUMENTS

| | | | | |
|---|---|---|---|---|
| CN | 106953436 A | * | 7/2017 | ............... H02K 1/20 |
| DE | 102016119650 | * | 4/2018 | |
| DE | 102016119650 A1 | | 4/2018 | |
| DE | 102016119654 A1 | | 4/2018 | |
| JP | 2010252453 A | * | 11/2010 | |
| WO | 2020/145959 A1 | | 7/2020 | |

* cited by examiner

Primary Examiner — Jose A Gonzalez Quinones
(74) Attorney, Agent, or Firm — David B. Kelley; Brooks Kushman P.C.

(57) ABSTRACT

An electric machine stator includes a soft magnetic yoke having a cylindrical yoke body extending along a central axis, with an outer surface and an inner periphery defining a central opening about the central axis, and a plurality of soft magnetic stator teeth. Each stator tooth defines a first set of air pockets, and a second set of air pockets. An electric machine rotor and permanent magnet material with air pockets are also provided.

18 Claims, 7 Drawing Sheets

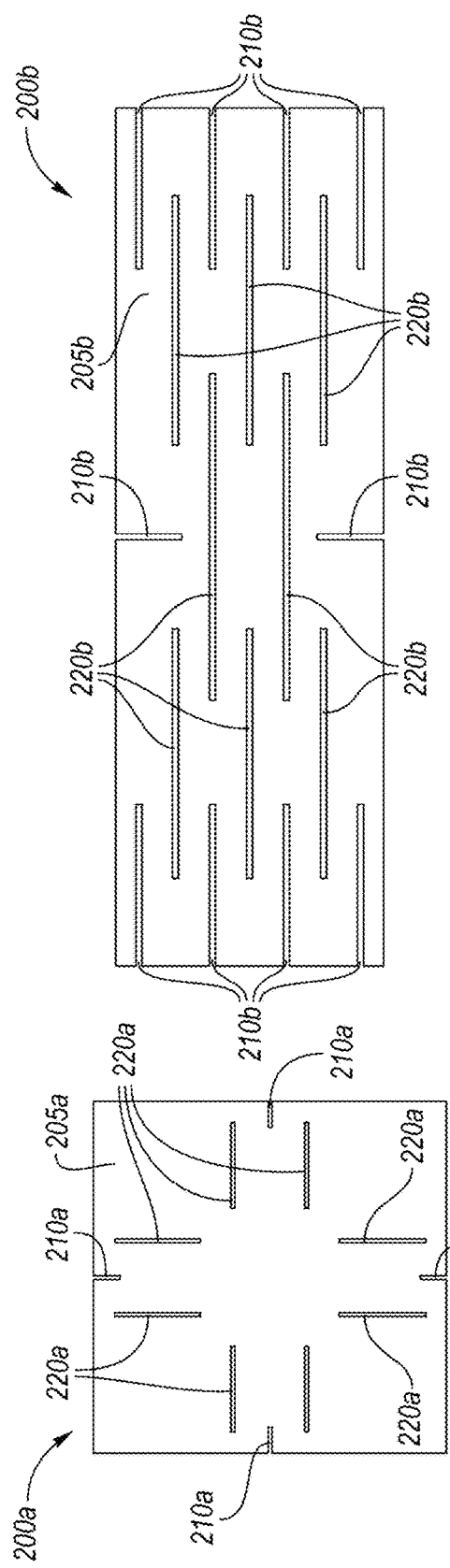
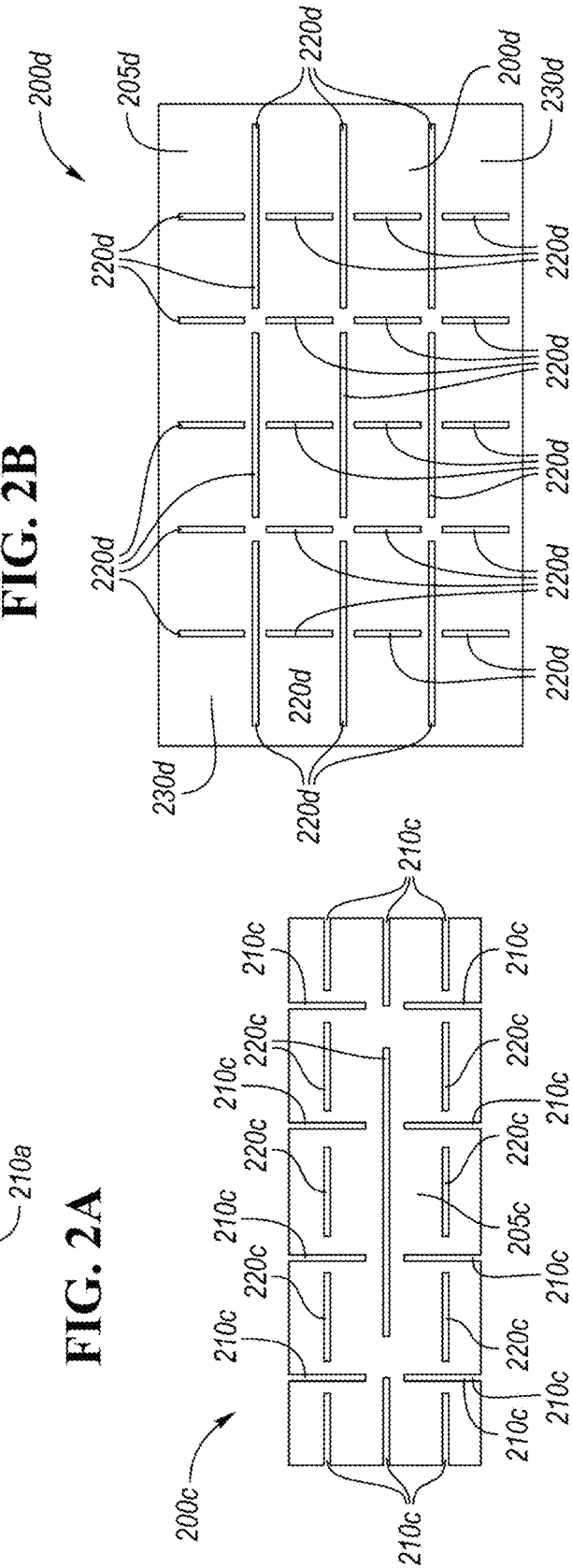
FIG. 2A
FIG. 2B
FIG. 2C
FIG. 2D

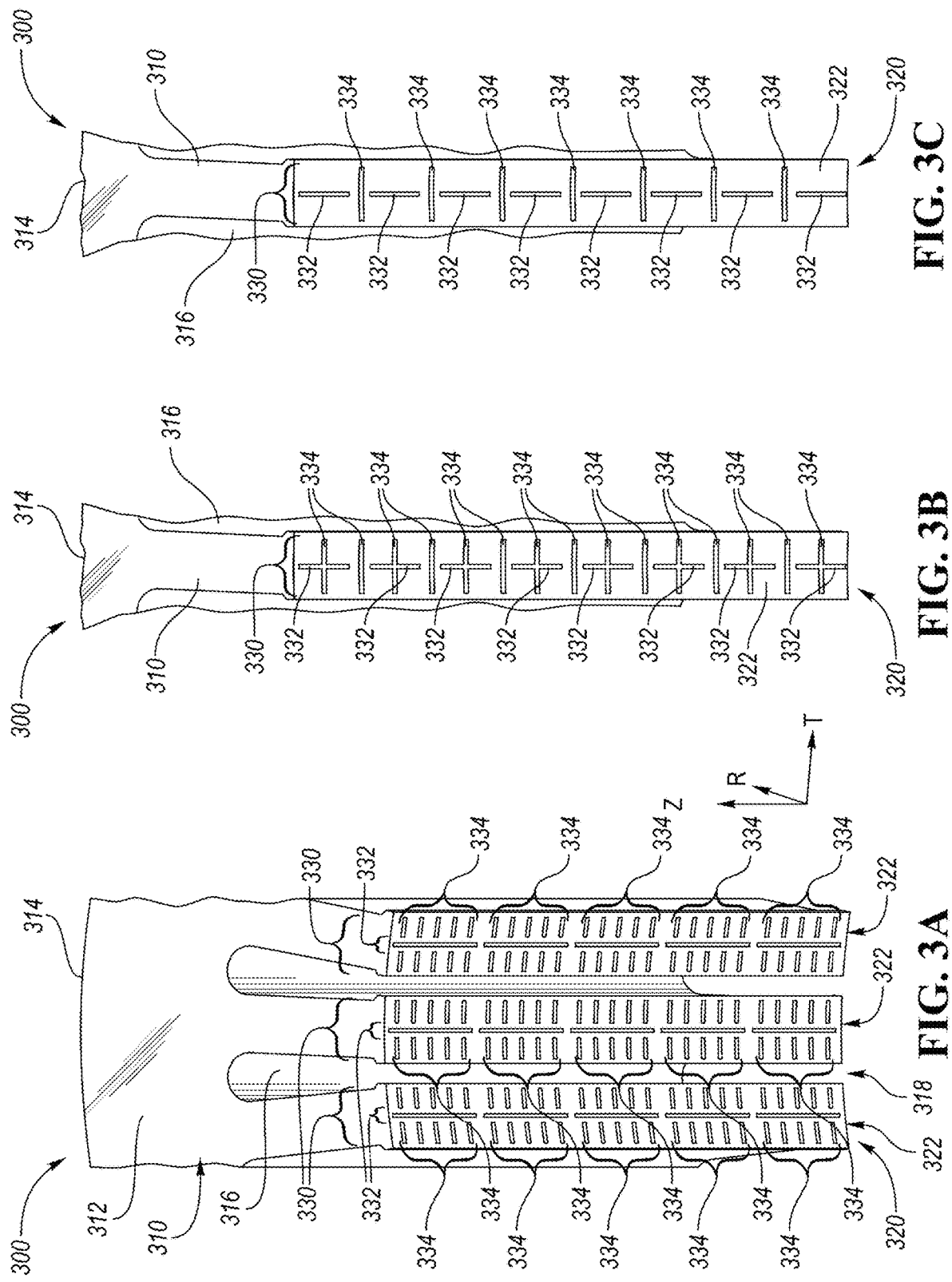

ADDITIVELY MANUFACTURED MAGNETIC MATERIALS WITH STRUCTURAL DESIGNS

TECHNICAL FIELD

The present application is directed to magnetic materials having three-dimensional structures to reduce eddy current loss, and more particularly, magnetic cores and permanent magnets with three-dimensional structures, and methods of producing the same.

BACKGROUND

Conventional magnetic cores (e.g., stator cores and rotor cores) employ various methods to reduce core losses, such as laminating the core, or using compacted insulated powders or flakes to form the core. Conventional additively manufactured magnetic materials for compacting magnetic cores and permanent magnets, are typically formed as a solid block without laminating. Alternatively, laminated structures with insulating (or non-conductive) layers can help to reduce the eddy current loss by restricting the eddy current path—within the thin laminated layers. These insulation layers should be capable of withstanding the high-temperature heat treatment of the magnetic materials which is employed to increase the part density and improve material properties. Furthermore, laminating the magnetic material in-situ during the additive manufacturing process may be challenging since a very thin layer of insulation needs to be deposited using a compatible additive manufacturing process. As such, both approaches are challenging when using additive manufacturing.

SUMMARY

According to one or more embodiments, an electric machine stator includes a soft magnetic yoke having a cylindrical yoke body extending along a central axis, with the yoke body having an outer surface defining an outer periphery, and an inner periphery defining a central opening about the central axis. The electric machine stator also includes a plurality of soft magnetic stator teeth connected to the yoke body on the inner periphery and extending towards the central axis. Each stator tooth defines a first set of air pockets spaced and extending axially along the stator tooth based on the center, with each air pocket of the first set extending from an inner surface of the stator tooth radially outward toward the outer surface. Each stator tooth further defines a second set of air pockets spaced axially along the stator tooth and extending tangentially across the stator tooth with respect to the outer surface, with each air pocket of the second set extending from the inner surface radially outward toward the outer surface.

According to at least one embodiment, the outer surface of the cylindrical yoke body may define a third set of air pockets, with each air pocket of the third set extending along the outer periphery and spaced axially over the outer surface with respect to the center. In further embodiments, the cylindrical yoke body may have a top surface defined at a first end of the cylindrical yoke body along the central axis, and a bottom surface opposite the top surface, and one or both of the top and bottom surfaces may include a fourth set of air pockets defined therein and extending from the top or bottom surface to the outer surface. In at least one other embodiment, the cylindrical yoke body may have a top surface defined at a first end of the cylindrical yoke body along the central axis, and a bottom surface opposite the top surface, and one or both of the top and bottom surfaces may include a fourth set of air pockets defined therein and extending from the top or bottom surface to the outer surface. In certain embodiments, the air pockets from the first set may be spaced to form a center line between a pattern of air pockets of the second set. In at least one embodiment, the air pockets from the first set and the second set may be positioned in an alternating pattern in the axial direction along each stator tooth. In one or more embodiments, every other air pocket from the second set may overlap the air pocket from the first set to form a patterned air pocket between other air pockets of the second set. In at least one embodiment, each air pocket may be sized and positioned within each stator tooth to direct eddy current and reduce eddy current loss. In certain embodiments, each air pocket may be open at the inner surface toward the central opening and closed to radially extending surfaces the stator teeth. In other embodiments, each air pocket may be closed to the inner surface and closed to radially extending surfaces of the stator teeth. In certain embodiment, at least one air pocket may include an insulating member positioned within the at least one air pocket.

According to one or more embodiments, an electric machine rotor includes a soft magnetic yoke having a cylindrical yoke body with an outer surface defining an outer periphery, and an inner surface having an inner periphery defining a central opening about a center axis. The yoke body includes an arc-shaped segment set positioned radially inward of the outer surface, with the arc-shaped segment set includes adjacent arc-shaped segments concentrically shaped according to a center positioned radially outward from the outer surface. The adjacent arc-shaped segments are connected by axially spaced and radially extending connecting members. Each of the arc-shaped segments define radial air pockets axially spaced and extending radially outward toward the outer surface and define axial air pockets between the adjacent arc-shaped segments and between connecting members in the axial direction. Each radial air pocket is closed to axial air pockets.

According to at least one embodiment, the yoke body may include a plurality of arc-shaped segment sets positioned equidistantly about the circumference of the yoke body such that each arc-shaped segment set includes adjacent arc-shaped segments concentrically shaped according to a corresponding center positioned radially outward from the outer surface. In one or more embodiments, a radially inward arc-shaped segment may include fewer radial air pockets than an adjacent radially outward arc-shaped segment. In certain embodiments, radial air pockets in a radially inward arc-shaped segment of the adjacent arc-shaped segments may be spaced farther apart than radial air pockets in an adjacent radially outward arc-shaped segment. In at least one embodiment, a radially inward axial air gap between adjacent arc-shaped segments may be wider in the radial direction than a radially outward axial air gap. According to one or more embodiments, the connecting members may include axially aligned sets of connecting members, and each arc-shaped segment may include axially aligned radial air pockets which are axially aligned with the axially aligned set of connecting members. In at least one embodiment, a top air pocket and a bottom air pocket of the axial air pockets may be open to and defined in a top surface and bottom surface of the yoke body, respectively. In at least one embodiment, each air pocket and air gap may be sized and positioned to direct eddy current and reduce eddy current loss. In certain embodiments, at least one air pocket may include an insulating member positioned within the at least one air pocket.

According to one or more embodiments, a permanent magnet includes a hard magnetic body having a shaped magnetic body and a magnetization direction. The hard magnetic body defines air pockets closed to external surfaces of the magnetic body, with each air pocket defining a plane parallel to the magnetization direction. In one or more embodiments, at least one air pocket may be positioned such that the plane is perpendicular to a magnet body plane defined by an edge of the magnet body.

BRIEF DESCRIPTION OF THE DRAWINGS

FIGS. 2A-D show schematic illustrations of magnetic cores with air pocket patterns, according to one or more embodiments;

FIG. 3A is a partial perspective view of stator teeth of an electric machine stator, according to an embodiment;

FIG. 3B is a partial perspective view of a stator tooth of an electric machine stator, according to another embodiment;

FIG. 3C is a partial perspective view of a stator tooth of an electric machine stator, according to yet another embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to degrees of offset from an angle when referring to substantially perpendicular or parallel). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

According to one or more embodiments, soft magnetic materials include patterned air pockets to increase the eddy current path length and reduce the cross-sectional area of the magnetic flux loop to reduce eddy current loss within the magnetic material. The air pockets can be defined in the magnetic materials by additively manufacturing the magnetic material instead of lamination of the magnetic material layers with insulation layers. As such, unique structural designs tailored to particular eddy current paths can be formed. The air pockets guide eddy current paths and shape the magnetic flux direction without significantly impacting magnetic permeability and saturation flux density, such that the magnetic flux can be anisotropic and generate locally desired flux patterns in the magnetic materials.

Figure 1A:
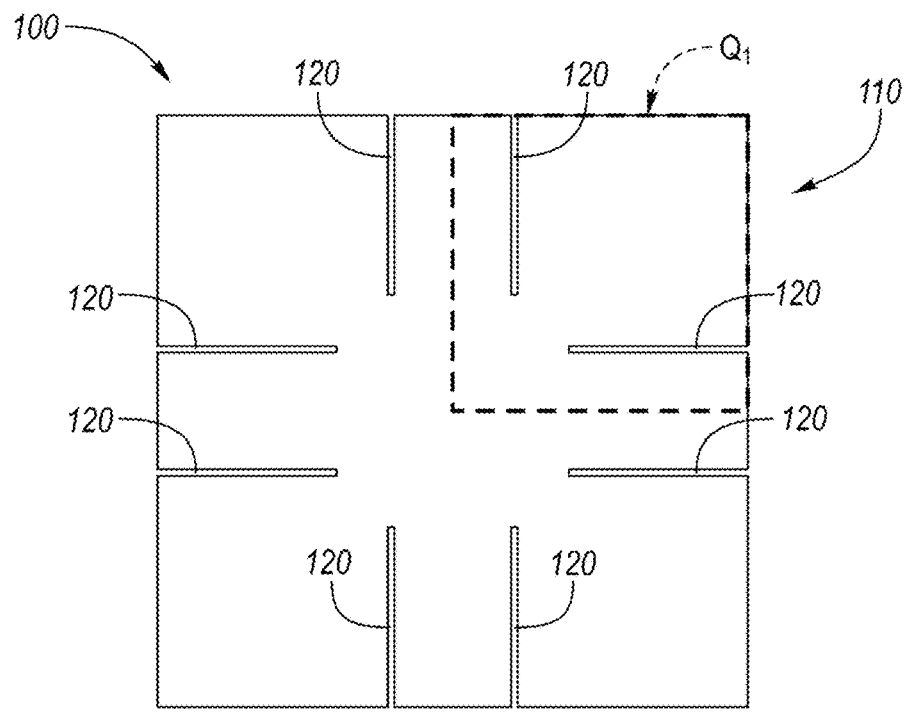
FIG. 1A shows a schematic illustration of a magnetic core from a viewing plane perpendicular to the magnetic flux.
Figure 1B:
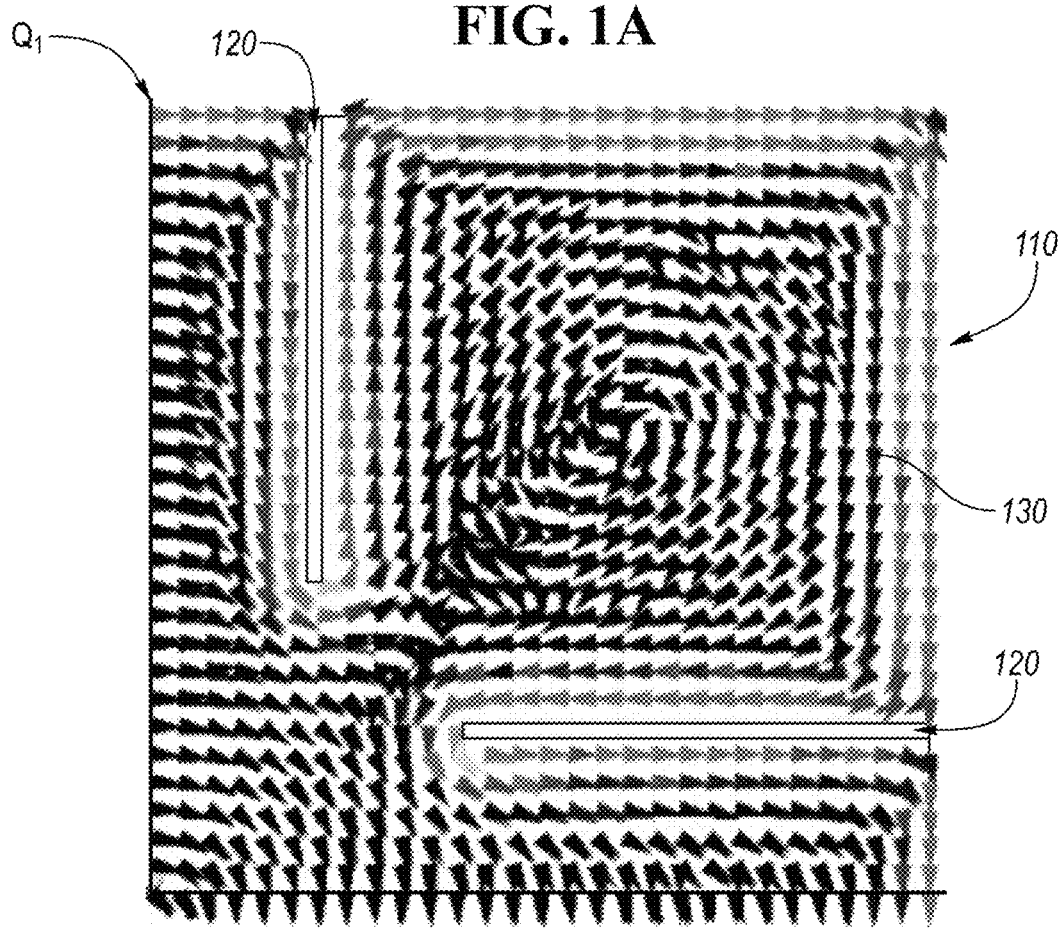
FIG. 1B shows a schematic illustration of the eddy current path of the region $Q_1$ of the conventional magnetic core of FIG. 1A.

Referring to FIG. 1A, an example of a structural design in an additively manufactured magnetic core 100 is shown. The cross-section of the additively manufactured magnetic core 100 is with the viewing plane being perpendicular to the magnetic flux into or out of the page (not shown). The magnetic core 100 may have unit cells 110 with defined air pockets 120 which are open to the external surfaces 102 of the magnetic core 100. In FIG. 1B, a finite element simulation using an axisymmetric model of the quadrant $Q_1$ of the unit cell 110 is shown. FIG. 1B shows that the air pockets 120 force the eddy current (as shown by arrows depicting paths 130) to take a longer meandering path, as shown by arrows depicting paths 130, and the shading depicting eddy current density. As such, the resistance over the length of the paths 130 is increased, and the eddy current density and loss is reduced. The eddy current loss reduction is directly related to the air pocket 120 design. Notably, the length of the air pocket 120 reduces eddy current loss because the current path length increases with increases in the length of the air pocket 120. Therefore, air pockets 120 with the longest side perpendicular to the local eddy current direction shown by arrows 130 are the most effective in blocking the path 130 and reducing loss. Since saturation flux density and magnetic permeability of the magnetic core 100 is inversely proportionally related to the volume of the air pockets 120, designing the air pockets 120 with minimal air pocket volume can optimize magnetic permeability and saturation flux density. Thus, air pockets 120 can be designed with large aspect ratios (i.e., large lengths as compared to widths), with the long dimension being perpendicular to the local eddy current direction. For example, in certain embodiments the aspect ratio (length to width) may be 1:500, in other embodiments 1:250, and in yet other embodiments 1:100. In further embodiments, the aspect ratio may be 1:75, and in yet further embodiments, the aspect ratio may be 1:50. In at least one embodiment, the aspect ratio may be at least 1:2, in other embodiments, at least 1:5 and in yet further embodiments, at least 1:10. Moreover, the air pockets 120 need not be linear designs, and although only linear designs are shown in the Figures, other shapes are also contemplated, such as, but not limited to, curvy shapes, oscillating shapes, or other patterns that have a dimensional aspect forming a long dimension for being perpendicular to the eddy current direction. The air pocket size and dimensions may be selected based on the size of the magnetic core, stator, or rotor, and may be constrained based on not cutting through the plane that is perpendicular to the magnetic flux. Furthermore, the depth of the air pockets may also depend on the dimensions of the magnetic core, stator, or rotor. For example, the smallest dimension of the air pocket (i.e., width), may be, in some embodiment 1 μm to 75 cm, in other embodiment 1 μm to 50 cm, and in yet another embodiment, 1 μm to 40 cm.

Furthermore, additively manufactured magnetic materials can be formed with air pockets exposed to external surfaces of the magnetic body (as can be seen in FIG. 1) or can be formed within the magnetic material body without exposing the air pocket to the external surfaces of the cores, as shown in the patterns of FIGS. 2A-D. Additive manufacturing technologies such as powder bed fusion and binder jetting form the magnetic bodies by holding loose powder together by melting or gluing, such that the air pockets are exposed to the external surface to allow removal of unused loose powder through a depowdering process. However, additive manufacturing technologies such as direct energy deposition and 3D screen printing can form air pockets that do not need exposure to the external surface for depowdering, and as such, can form more complex design structures within the magnetic body. Referring to FIGS. 2A-D, structural designs for magnets 200a, 200b, 200c, 200d are shown with magnet bodies 205a, 205b, 205c, 205d having patterns of exposed air pockets 210a, 210b, 210c, 210d and air pockets 220a, 220b, 220c, 220d closed to the external surfaces, as shown in a viewing plane perpendicular to the magnetic flux. Both sets of air pockets are defined in the respective magnetic body, and can have various geometric shapes, aspect ratios, width, length, location, and arrangement, and the depiction of certain patterns in FIGS. 2A-D are examples and not intended to be limiting. For example, uniform air pockets having a slit-like shape can be evenly distributed throughout the body in certain embodiments, or be distributed unevenly depending on proximity to the surface in other embodiments. The air pockets 220a, 220b, 220c, 220d can be overlapping such that they are partially interconnected or be disconnected from each other. Similarly, the air pockets 210a, 210b, 210c, 210d can be partially interconnected such that the air pockets 210a, 210b, 210c, 210d are exposed to the surface at more than one location, or can be disconnected from each other. In the example shown in FIG. 2D, the reduced eddy current loss is based on the reduced cross-sectional area of the flux loop as controlled by the position and size of the air pockets 220d. Therefore, both electromotive force and eddy current are suppressed by the air pockets 220d forming a unit cell 230d, with the core body 205d being built up by the repetition of the unit cell 230d. The smaller the area enclosed by the unit cell 230d, the smaller the eddy current loss is in the core body 200d. The area enclosed by the unit cell 230d can vary across positions of the body 200d based on local eddy loss, and the unit cell 230d may be any suitable shape, such as, but not limited to, square, or hexagon.

According to one or more embodiments, additively manufactured soft magnetic materials include air pockets defined therein and positioned to shape the direction of the eddy current path and the magnetic flux. The air pockets have low magnetic permeability, the arrangement and geometry of the air pockets can be used to guide the eddy current path and shape the direction of the magnetic flux. As will be discussed in the examples below, different structural designs and patterns can be used at different locations throughout the magnetic body to meet regional core loss and magnetic flux distribution requirements.

Referring to FIGS. 3A-C, an electric machine stator 300 is partially shown according to an embodiment. The electric machine stator 300 includes a soft magnetic yoke 310 having a cylindrical yoke body 312 extending along a central axis Z, with the yoke body 312 being made of a soft magnetic material. Soft magnetic materials are defined as magnetic materials with intrinsic coercivity less than 1000 A/m. Examples of soft magnetic materials include, but are not limited to, iron, Fe—Si alloys, Fe—Co alloys, Fe—Ni alloys, Fe—Si—Al alloys, and the like. The yoke body 312 includes an outer surface 314 which defines an outer periphery of the cylindrical yoke body 312. The yoke body 312 further has an inner surface 316 defining an inner periphery forming a central opening 318 about the central axis Z. The electric machine stator 300 further includes a plurality of stator teeth 320 connected to the yoke body 312 at the inner surface 316, and positioned about the inner periphery. Each stator tooth 320 extends towards the central axis Z. Each stator tooth 320 defines a plurality of air pockets 330 within the tooth 320. Each air pocket 330 is defined in the tooth 320 such that each air pocket 330 extends from an inner surface 322 of the stator tooth 320 radially outward towards the outer surface 314 of the yoke body 312, with the air pockets 330 being arranged in the tooth 320 and not extending into the yoke body 312. As such, the air pockets 330 are closed to the outer surface 314 such that is defined within the stator tooth. The air pockets 330 are shown in the Figures as being open to the inner surface 322 of the stator tooth 320. Although shown as open to the inner surface 322, in other embodiments (not shown), the air pockets 330 may be closed to the inner surface 322 such that they are inset a from the inner surface 322, and depiction of the air pockets 330 being open to the inner surface 322 is not intended to be limiting. In the embodiments shown, the air pockets 330 may be open only to the inner surface 322 (and not to any other surfaces).

In the embodiment shown in FIG. 3A, each stator tooth 320 includes a first set 332 of air pockets 330 which are spaced in the axial direction (with respect to the central axis Z) along the tooth 320, and are shaped to be elongated and extend in the axial direction, such that the air pockets 332 are parallel to the axial-radial plane. Each stator tooth 320 further includes a second set 334 of air pockets 330. The air pockets 330 of the second set 334 are also spaced in the axial direction with respect to the central axis Z along the tooth 320, however each air pocket 330 of the second set 334 extends tangentially across the stator tooth 320, as with respect to the outer surface 314, such that it runs parallel to the tangential (or circumferential)-radial plane. Furthermore, in certain embodiments, the second set 334 may be substantially perpendicular to the first set 332

As previously discussed, the dimensions of the air pockets 330 may be selected based on the size of the magnetic core, and may be constrained by not cutting through the plane that is perpendicular to the magnetic flux. Additionally, the depth of the air pockets 330 may also depend on the dimensions of the magnetic core. Furthermore, based on optimizing air pocket volume, the size and dimensions may be designed with large aspect ratios (i.e., large lengths as compared to widths). For example, in certain embodiments the aspect ratio (length to width) may be 1:500, in other embodiments 1:250, and in yet other embodiments 1:100. In further embodiments, the aspect ratio may be 1:75, and in yet further embodiments, the aspect ratio may be 1:50. In at least one embodiment, the aspect ratio may be at least 1:2, in other embodiments, at least 1:5 and in yet further embodiments, at least 1:10. In certain examples, the smallest dimension of the air pocket (i.e., width), may be, in some embodiment 1 μm to 75 cm, in other embodiment 1 μm to 50 cm, and in yet another embodiment, 1 μm to 40 cm. Moreover, the air pockets 330 need not be linear designs, and although only linear designs are shown in the Figures, other shapes are also contemplated, such as, but not limited to, curvy shapes, oscillating shapes, or other patterns that have a dimensional aspect forming a long dimension for being perpendicular to the eddy current direction.

In certain examples, as shown in FIG. 3A, the aspect ratio of the air pockets 330 of the first set 332 may be greater than the aspect ratio of the air pockets 330 of the second set 332. Furthermore, there may be any number of air pockets 330 included in each set 332, 334, and the first and second sets 332, 334 may cooperate to form a repeating pattern across the stator tooth 320. Although one pattern is shown in FIG. 3A, any suitable pattern to control the eddy current path and magnetic flux direction is contemplated (see FIGS. 3B-3C for example). Generally, the stator tooth 320 area has one dimensional flux lines and experiences high core loss. The air pockets 330 can be arranged as shown in FIG. 3A, with certain air pockets 330 running parallel to the direction of the flux, with the two sets 332, 334 of air pockets 330 arranged perpendicular to each other with tangential and axial orientations respectively.

Additional patterns are shown in FIG. 3B and FIG. 3C. In both FIGS. 3B and 3C, the air pockets 330 alternate from the first set 332 and the second set 334 along the axial direction of the stator tooth 320. In FIG. 3B, however, certain air pockets 330 of the first set 332 and the second set 334 overlap to form a plus-shaped cross section for the air pockets 330. As such, certain air pockets 330 are interconnected within the stator tooth 320 to allow for more complex structures resulting in more tailored flux control. In FIG. 3C, the air pockets 330 from the first set 332 are not interconnected with the air pockets 330 of the second set 334.

Figure 4:
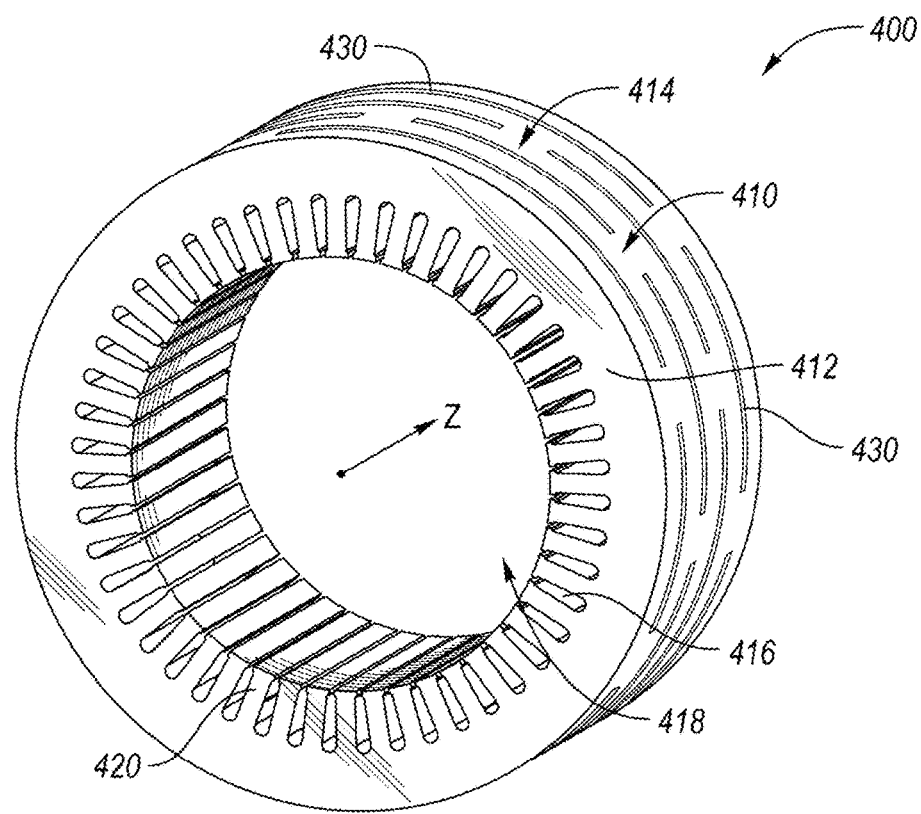
FIG. 4 is a perspective view of an electric machine stator, according to an embodiment.

Referring to FIG. 4, an electric machine stator 400 is shown according to another embodiment. The electric machine stator 400 includes a soft magnetic yoke 410 having a cylindrical yoke body 412 extending along a central axis Z being made of a soft magnetic material. Soft magnetic materials are defined as magnetic materials with intrinsic coercivity less than 1000 A/m. Examples of soft magnetic materials include, but are not limited to, iron, Fe—Si alloys, Fe—Co alloys, Fe—Ni alloys, Fe—Si—Al alloys, and the like. The yoke body 412 includes an outer surface 414 which defines an outer periphery of the cylindrical yoke body 412. The yoke body 412 further has an inner surface 416 defining an inner periphery forming a central opening 418 about the central axis Z. The electric machine stator 400 further includes a plurality of stator teeth 420 connected to the yoke body 412 at the inner surface 416, and positioned about the inner periphery. Each stator tooth 420 extends towards the central axis Z. Electric machine stator 400 further includes air pockets 430 defined within the yoke body 412, extending into the body 412 from the outer surface 414. The air pockets 430 extended circumferentially in the direction about the periphery as defined by the outer surface 414, and are spaced apart in the axial direction with respect to central axis Z. Furthermore, the air pockets 430 are radially displaced about the periphery of the outer surface 414. The air pockets 430 may, in certain embodiments, as shown in the Figures, be exposed to the outer surface 414. In other embodiments (not shown), the air pockets 430 may be closed to the outer surface 414 such that they are inset a from the surface 414.

Figure 5:
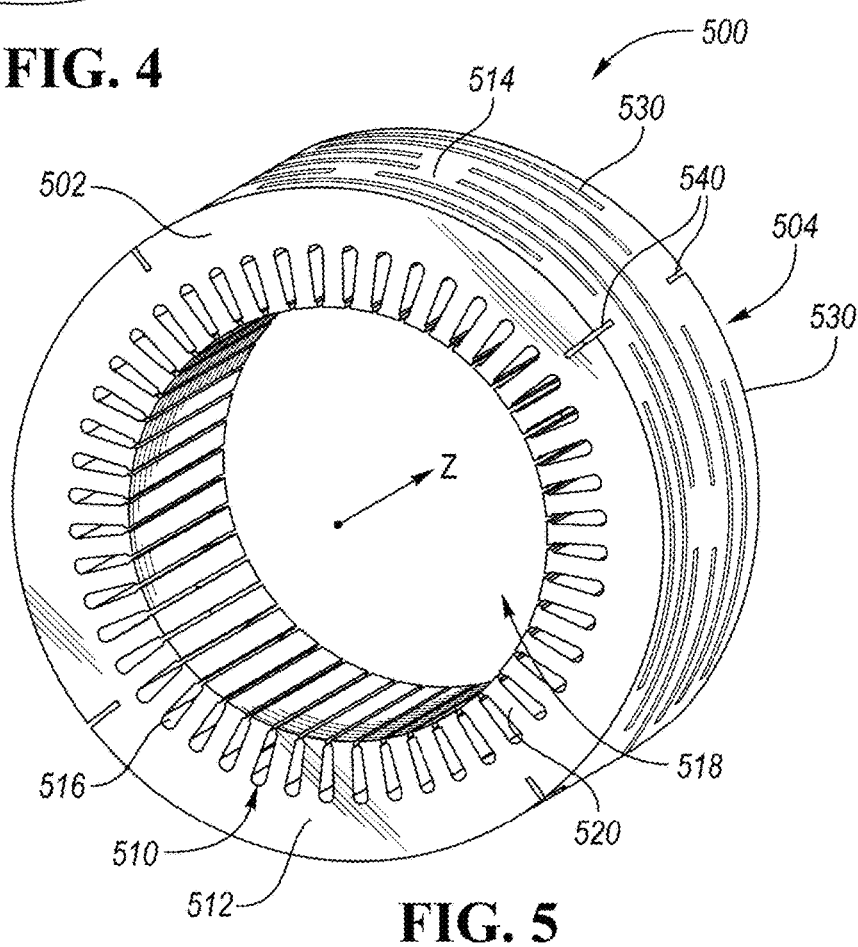
FIG. 5 is a perspective view of an electric machine stator, according to another embodiment.

Referring to FIG. 5, an electric machine stator 500 is shown according to yet another embodiment. The electric machine stator 500 includes a soft magnetic yoke 510 having a cylindrical yoke body 512 extending along a central axis Z being made of a soft magnetic material. Soft magnetic materials are defined as magnetic materials with intrinsic coercivity less than 1000 A/m. Examples of soft magnetic materials include, but are not limited to, iron, Fe—Si alloys, Fe—Co alloys, Fe—Ni alloys, Fe—Si—Al alloys, and the like. The yoke body 512 includes an outer surface 514 which defines an outer periphery of the cylindrical yoke body 512. The yoke body 512 further has an inner surface 516 defining an inner periphery forming a central opening 518 about the central axis Z. The electric machine stator 500 further includes a plurality of stator teeth 520 connected to the yoke body 512 at the inner surface 516, and positioned about the inner periphery. Each stator tooth 520 extends towards the central axis Z. The electric machine stator 500 further includes air pockets 530 defined within the yoke body 512, similar to FIG. 4. Furthermore, the yoke 510 has a top surface 502 and a bottom surface 504, as defined along the central axis Z. The electric machine stator 500 includes air pockets 540 that extend from the top surface 502 and/or the bottom surface 504 to the outer surface 514. The air pockets 540 may be radially spaced about the top surface 502 and/or the bottom surface 504 with respect to the central axis Z. In certain embodiments, the air pockets 540 may be equidistantly spaced about the top surface 502 and/or the bottom surface 504, and the air pockets 540 in the top surface 502 and the bottom surface 504 may be aligned in the cylindrical yoke body 512 in the axial direction.

Although the embodiments of FIGS. 3A-C, 4 and 5 are shown separately, it is contemplated that an electric machine stator of any of the embodiments may include air pockets in one or more of the locations as described, and in any suitable pattern or combination of patterns based on the eddy current path control and magnetic flux control required. In addition to the consideration of electromagnetic requirements, the air pocket location, arrangement, and shape may also be optimized between locations for mechanical integrity. For example, the stator may include air pockets in the stator teeth and the yoke body (in either or both the locations shown in FIGS. 4-5). In other examples, the stator may include air pockets in one or more regions of the yoke body only (e.g., only the top/bottom surface to outer surface, or only the outer surface air pockets).

Figure 6A:
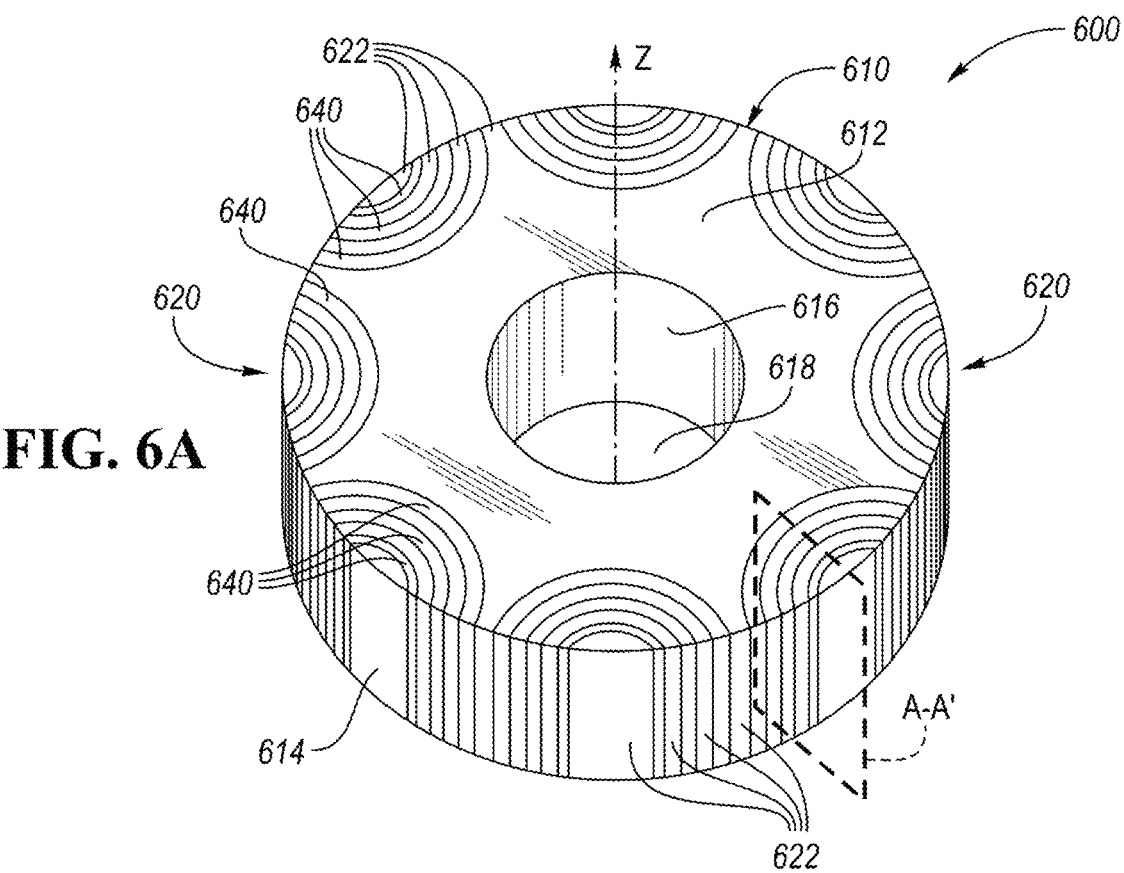
FIG. 6A is a perspective view of an electric machine rotor, according to an embodiment.
Figure 6B:
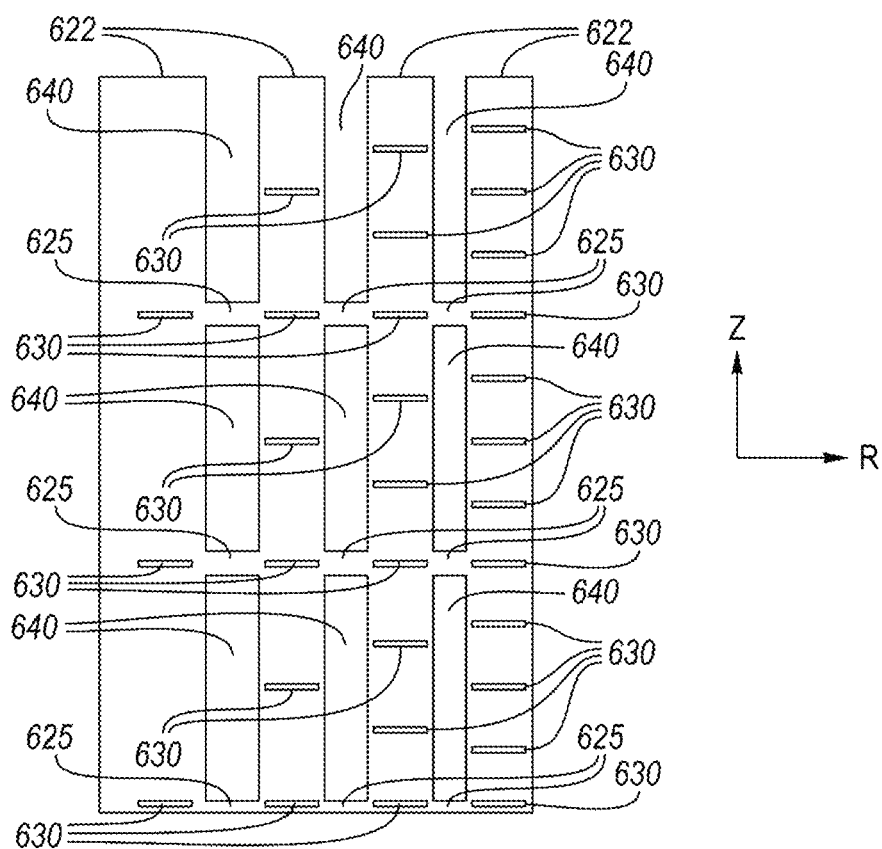
FIG. 6B is a cross-sectional view of the electric machine rotor of FIG. 6A taken along plane B-B'.

Referring to FIG. 6A and FIG. 6B, an electric machine rotor 600 is shown according to another embodiment, with FIG. 6B depicting a radial and axial cross section taken at plane A-A'. The electric machine rotor 600 includes a rotor back-iron 610 (or, hereinafter interchangeably, soft magnetic yoke 610) having a cylindrical body 612 extending along a central axis Z being made of a soft magnetic material. Soft magnetic materials are defined as magnetic materials with intrinsic coercivity less than 1000 A/m. Examples of soft magnetic materials include, but are not limited to, iron, Fe—Si alloys, Fe—Co alloys, Fe—Ni alloys, Fe—Si—Al alloys, and the like. The body 612 includes an outer surface 614 which defines an outer periphery of the cylindrical body 612. The body 612 further has an inner surface 616 defining an inner periphery forming a central opening 618 about the central axis Z. The body 612 includes an arc-shaped segment set 620 positioned radially inward of the outer surface 614. In certain embodiments, as shown in FIG. 6A, the soft magnetic yoke 610 includes a plurality of arc-shaped segment sets 620 circumferentially spaced about the body 612. Each arc-shaped segment set 620 includes adjacent arc-shaped segments 622 which are concentrically shaped with respect to a center positioned radially outward from the outer surface 614. Each arc-shaped segment set 620 may include any number of arc-shaped segments 622, and the depiction of any particular number of segments 622 is not intended to be limiting. Each of the arc-shaped segments 622 are connected to the adjacent segments 622 by connecting members 625, which extend in the radial direction to connect adjacent arc-shaped segments 622. The connecting members 625 are spaced apart in the axial direction with respect to the central axis Z. Each of the arc-shaped segments 622 defines radially extending (or radial) air pockets 630 therein for controlling magnetic flux and tailoring eddy current pathways in the arc-shaped segment 622, with each radial air pocket 630 being closed to external surfaces of the arc-shaped segment 622. The air pockets 630 are axially spaced over the arc-shaped segment 622, and each air pocket 630 extends in the radial direction toward the outer surface 614. Furthermore, the soft magnetic yoke 610 has axially extending (or axial) air pockets 640 defined radially between the adjacent arc-shaped segments 622 and between connecting members 625 in the axial direction. The air pockets 630 and 640 cooperate to improve machine performance by creating anisotropic flux. The axially extending air pockets 640 create flux barriers while the air pockets 630 break up the eddy current path within the axial division. Although shown open to the top surface of the body 612 and to the outer surface 614, the axial air pockets 640 may be closed to the external surfaces of the body 612 such that they are inset to a depth from the external surfaces, and the depiction of the axial air pockets 640 being open to the external surfaces is not intended to be limiting. Furthermore, the radial air pockets 630 are closed to the axial air pockets 640.

In certain embodiments, the size of the axial air pockets 640 can vary in the radial direction. For example, the air pockets 640 that are closer to the central opening 618 may be wider (in the radial direction) than the air pockets 640 that are positioned radially outward towards the outer surface 614. Furthermore, the density of the air pockets 630 may vary between adjacent arc-shaped segments 622 from the arc-shaped segments 622 near the central opening 618 to those toward the outer surface 614. For example, the arc shaped segment 622 toward the outer surface 614 may include more air pockets 630 than an arc-shaped segment 622 toward the central opening 618. This density distribution is based on the rotor surface 614 being a high loss region, requiring more air pockets 630. In one or more embodiments, as shown in FIG. 6B, each arc-shaped segment 622 may include air pockets 630 axially aligned with the connecting members 625 to minimize the flux leakage. Furthermore, although shown generally as similarly dimensioned, the air pockets 630 may have different geometries at different positions within the yoke body 612, as based on the desired flux distribution, and the depiction of FIGS. 6A-B is not intended to be limiting.

Figure 7A:
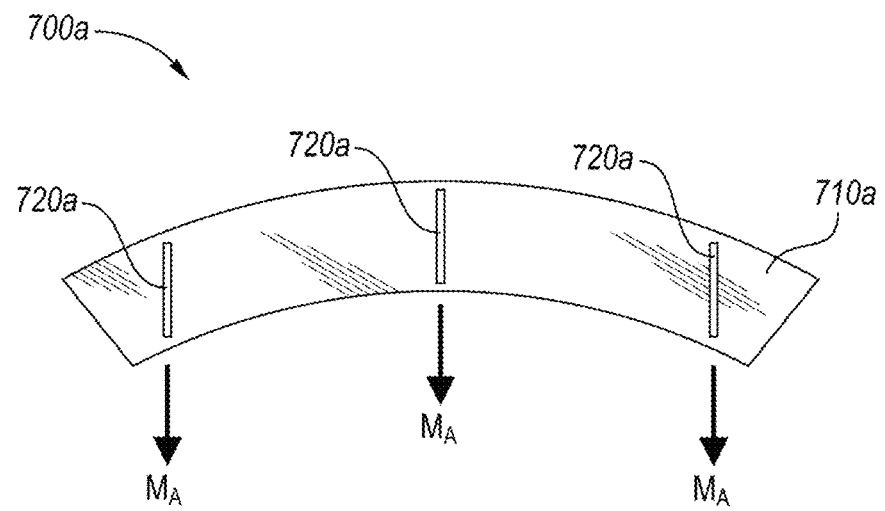
FIGS. 7A-B are top cross-sectional views of permanent magnets according to various embodiments.
Figure 7B:
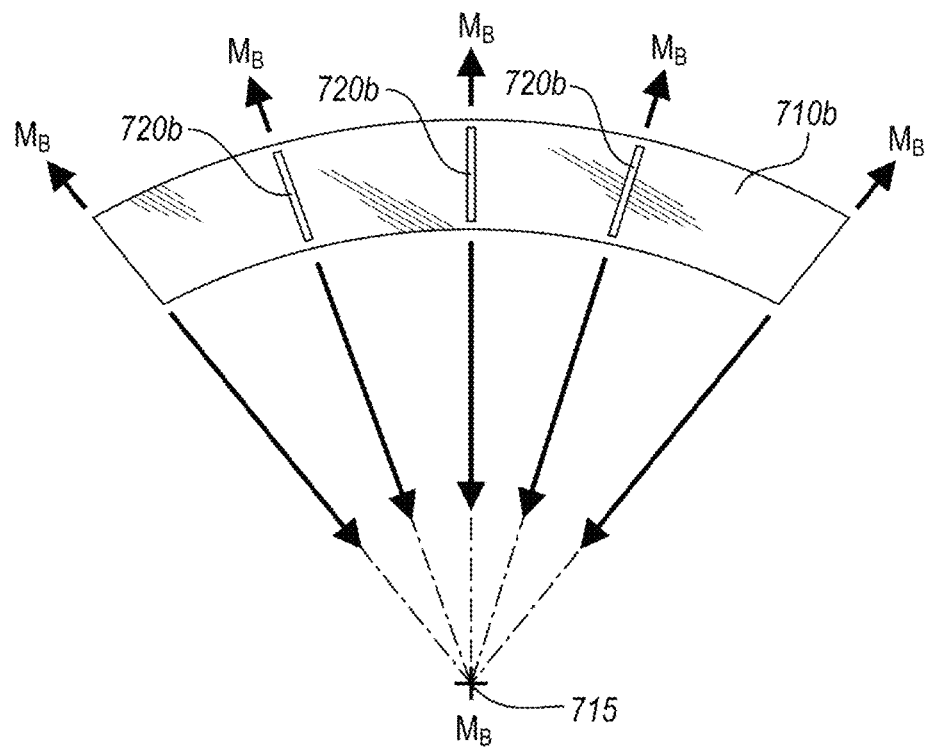

Referring to FIG. 7A-B, top cross-sectional views of permanent magnet 700a, 700b are shown according to various embodiments. The permanent magnet 700a, 700b is an arc-shaped permanent magnet made of a hard magnetic material, forming magnetic body 710a, 710b. The hard magnetic material may be any suitable material with an intrinsic coercivity larger than 1000 A/m, such as, but not limited to, Nd—Fe—B, Sm—Co, Alnico, and the like. The magnetic body 710a, 710b defines air pockets 720a, 720b therein for helping reducing eddy current loss. The planes of the air pockets 720a, 720b are aligned substantially parallel with the magnetization direction $M_A$, $M_B$ of the permanent magnets 700a, 700b. In FIG. 7A, the magnet 700a includes parallel air pockets 720b running parallel with the magnetization direction $M_A$. In FIG. 7B, the magnet 700b includes air pockets 720b extending radially outward with respect to a center 715 outside the magnet body 710, with the magnetization direction $M_B$ going radially outward from the center 715. The air pockets 720a, 720b are closed from the external surfaces of the magnet body 710a, 710b to segment the magnets. The air pockets in the segmented magnet reduce eddy current loss and therefore allow for a reduced magnet temperature such that likelihood of demagnetization can be reduced.

Figure 8A:
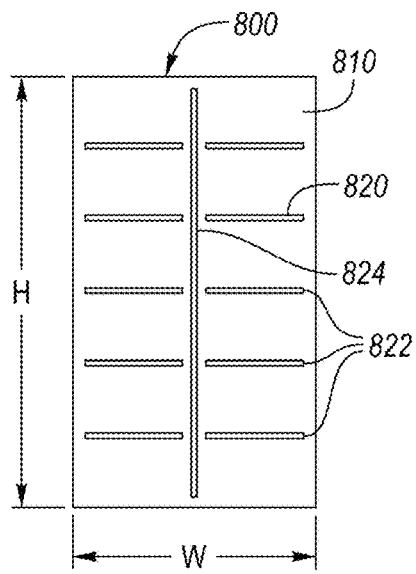
FIGS. 8A-E are top cross-sectional views of permanent magnets according various other embodiments.
Figure 8B:
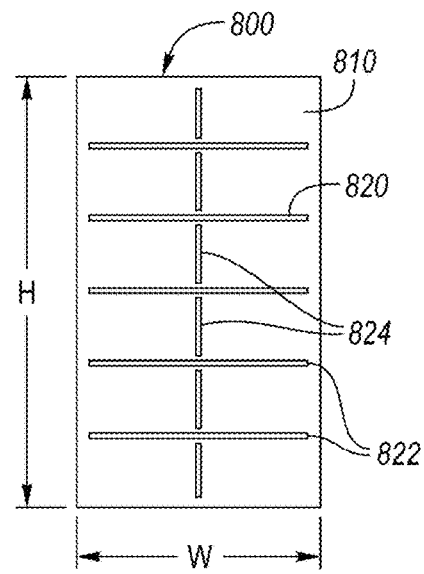
Figure 8C:
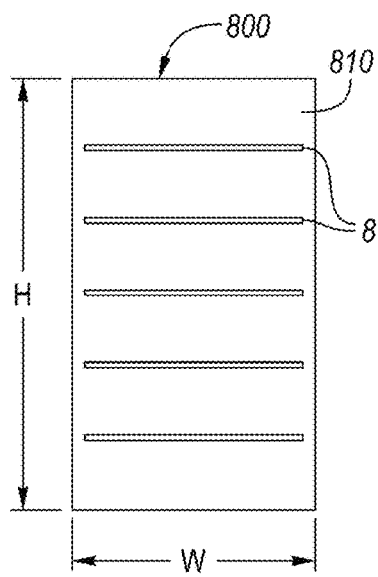
Figure 8D:
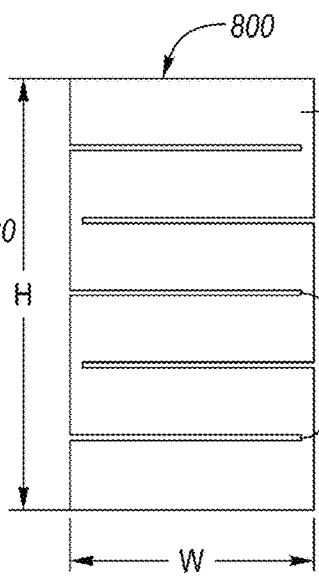
Figure 8E:
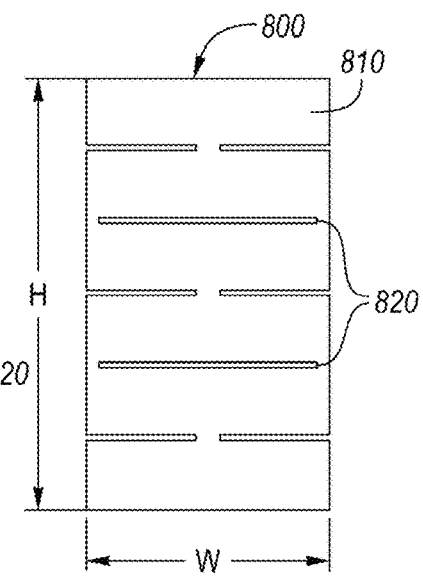

Referring to FIGS. 8A-E, a rectangular permanent magnet 800 is shown according to various embodiments. The permanent magnet 800 includes magnet body 810 with air pockets 820 defined therein. Patterns of the air pockets 820 are shown in FIGS. 8A-E. For example, in FIG. 8A, air pockets 820 are distributed as a first set 822 extending into the page (per the magnetization direction M), and are wide slits positioned over a height H of the magnet body 810. A second air pocket 824 is positioned substantially perpendicular to the air pockets 820 of the first set 822, and runs the length of the magnet body 810 over the height H of the magnet 800, between air pockets 820 of the first set 822 which are aligned on either side of the air pocket 824. In FIG. 8B, air pockets 824 that run over the height H of the body 810 are interspaced with air pockets 820 of the first set 822 therebetween. The air pockets 820 of the first set 822 are wider such that they extend over a portion of the width W of the magnet body 810, as compared with the embodiment of FIG. 8A. In FIGS. 8C-E, the air pockets 820 are all running parallel, and are spaced over the height H of the magnet body 810. The air pockets 820 may be equidistantly spaced over the height H and from the edges of the magnet body 810 (FIG. 8C), or may be alternatingly spaced closer to the edge (or exposed to the surface) of the magnet body 810 (as shown in FIG. 8D). Furthermore, as shown in FIG. 8E, the air pockets 820 may be spaced over the height H of the magnet body 810 and may be interrupted at a midpoint of the magnet body 810 such that the air pocket 820 is discontinuous. Furthermore, as can be seen in FIG. 8E, alternating air pockets 820 may not be disconnected, and may be positioned inward from the edges when compared to adjacent air pockets 820. Additional patterns and designs are also contemplated, (e.g., more complex shapes and structures or spacing) to tailor the eddy current control of the permanent magnet, and the depiction of certain patterns of air pockets 830 in permanent magnet 800 is not intended to be limiting.

It is further contemplated that by additively manufacturing the structural designs with the air pockets in the electric machine stator, rotor, and magnet materials, the structural designs may be formed with insulating materials positioned within the air pockets. Additive manufacturing allows for the material to be changed to an insulating material in the designs, such that the air pockets can form a region of a different material during the additive manufacturing process. To reduce eddy current loss, the materials can be insulators (e.g. ceramics, metal oxides, and metal nitrides), or highly resistive materials (e.g. silicon, intermetallics) or a combination of both. Filling the open air pockets in the design with other materials may also help to improve the mechanical integrity of the magnetic core. Thus, although not shown in the Figures, any or all of the air pockets disclosed herein may include an insulating member within air pocket(s), as determined by the particular current paths desired.

According to one or more embodiments, additively manufactured magnetic materials form bodies having air pockets defined therein. The air pockets are closed to the outer surface of the magnetic body, and are positioned and shaped to optimize the desired electromagnetic properties of the magnetic body. Additive manufacturing allows for the tailoring of air pocket shapes and positions within the body of the magnetic material, and forming the air pockets without exposure to the external surface of the magnetic body. As such, detailed patterns and designs can be utilized such that air pockets incorporated within the magnetic body can direct eddy current paths to reduce eddy current loss, as well as direct magnetic flux.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine stator comprising:
    a soft magnetic yoke having a cylindrical yoke body extending along a central axis, the yoke body having an outer surface defining an outer periphery, and an inner periphery defining a central opening about the central axis; and
    a plurality of soft magnetic stator teeth connected to the yoke body on the inner periphery and extending towards the central axis, each stator tooth defining
        a first set of air pockets spaced and extending axially along the stator tooth based on the center, with each air pocket of the first set extending from an inner surface of the stator tooth radially outward toward the outer surface, and
        a second set of air pockets spaced axially along the stator tooth and extending tangentially across the stator tooth with respect to the outer surface, with each air pocket of the second set extending from the inner surface radially outward toward the outer surface.

2. The electric machine stator of claim 1, wherein the outer surface of the cylindrical yoke body defines a third set of air pockets, each air pocket of the third set extending along the outer periphery and spaced axially over the outer surface with respect to the center.

3. The electric machine stator of claim 2, wherein the cylindrical yoke body has a top surface defined at a first end of the cylindrical yoke body along the central axis, and a bottom surface opposite the top surface, and one or both of the top and bottom surfaces includes a fourth set of air pockets defined therein and extending from the top or bottom surface to the outer surface.

4. The electric machine of claim 1, wherein the cylindrical yoke body has a top surface defined at a first end of the cylindrical yoke body along the central axis, and a bottom surface opposite the top surface, and one or both of the top and bottom surfaces includes a fourth set of air pockets defined therein and extending from the top or bottom surface to the outer surface.

5. The electric machine stator of claim 1, wherein the air pockets from the first set are spaced to form a center line between a pattern of air pockets of the second set.

6. The electric machine stator of claim 1, wherein the air pockets from the first set and the second set are positioned in an alternating pattern in the axial direction along each stator tooth.

7. The electric machine stator of claim 1, wherein every other air pocket from the second set overlaps the air pocket from the first set to form a patterned air pocket between other air pockets of the second set.

8. The electric machine stator of claim 1, wherein each air pocket is sized and positioned within each stator tooth to direct eddy current and reduce eddy current loss.

9. The electric machine stator of claim 1, wherein each air pocket is open at the inner surface toward the central opening and is closed to radially extending surfaces the stator teeth.

10. The electric machine stator of claim 1, wherein at least one air pocket includes an insulating member positioned within the at least one air pocket.

11. An electric machine rotor comprising:
    a soft magnetic yoke having a cylindrical yoke body with an outer surface defining an outer periphery, and an inner surface having an inner periphery defining a central opening about a center axis, the yoke body including an arc-shaped segment set positioned radially inward of the outer surface, the arc-shaped segment set including adjacent arc-shaped segments concentrically shaped according to a center positioned radially outward from the outer surface and being connected by axially spaced and radially extending connecting members, each of the arc-shaped segments defining radial air pockets axially spaced and extending radially outward toward the outer surface, and
        defining axial air pockets between the adjacent arc-shaped segments and between connecting members in the axial direction,
        wherein each axial air pocket is closed to the axial air pockets.

12. The electric machine rotor of claim 11, wherein the yoke body includes a plurality of arc-shaped segment sets positioned equidistantly about the circumference of the yoke body such that each arc-shaped segment set includes adjacent arc-shaped segments concentrically shaped according to a corresponding center positioned radially outward from the outer surface.

13. The electric machine rotor of claim 11, wherein a radially inward arc-shaped segment includes fewer radial air pockets than an adjacent radially outward arc-shaped segment.

14. The electric machine rotor of claim 11, wherein the radial air pockets in a radially inward arc-shaped segment of the adjacent arc-shaped segments are spaced farther apart than radial air pockets in an adjacent radially outward arc-shaped segment.

15. The electric machine rotor of claim 11, wherein a radially inward axial air pocket between adjacent arc-shaped segments is wider in the radial direction than a radially outward axial air pocket.

16. The electric machine rotor of claim 11, wherein the connecting members include axially aligned sets of connecting members, and each arc-shaped segment includes axially aligned radial air pockets which are axially aligned with the axially aligned set of connecting members.

17. The electric machine rotor of claim 11, wherein a top axial air pocket and a bottom axial air pocket of the axial air pockets is open to and defined in a top surface and bottom surface of the yoke body, respectively.

18. The electric machine rotor of claim 11, wherein at least one air pocket includes an insulating member positioned within the at least one air pocket.

* * * * *